UNITED STATES PATENT OFFICE.

CARL ALEXIS MAYER, OF BASLE, SWITZERLAND, ASSIGNOR TO THE SOCIÉTÉ L. DURAND, HUGUENIN & COMPAGNIE, OF SAME PLACE.

BLUE DYE.

SPECIFICATION forming part of Letters Patent No. 440,359, dated November 11, 1890.

Application filed October 12, 1889. Serial No. 326,836. (No specimens.)

*To all whom it may concern:*

Be it known that I, CARL ALEXIS MAYER, a citizen of the Swiss Republic, and a resident of Basle, Switzerland, have invented certain Improvements in the Manufacture of Coloring-Matters or Dye-Stuffs, of which the following is a specification.

In the United States Patent No. 253,721, granted to Horace Koechlin February 14, 1882, will be found described under the generic name of "gallocyanine" a coloring-matter produced by the reaction of nitroso derivatives of the tertiary aromatic amines on tannin, catechine, and gallic acid.

My present invention relates to the same class of invention, and has for its object the production of new gallocyanines obtained by the reaction of the same nitroso derivatives of the tertiary amines on a series of new derived bodies obtained from tannin and catechine. These new derived bodies are the amides obtained by the condensation of the tannin or catechine with the primary aromatic amines.

In order that my invention may be fully understood, I will describe, as an example, the preparation of the gallonaphtylamides—that is to say, the products of condensation of tannin with naphtylamines. These gallonaphtylamides are obtained by merely heating the tannin with the naphtylamine $\zeta$ or $\beta$. The product of condensation will be either gallonaphtylamide $\zeta$ or $\beta$, according as I employ for the production thereof the naphtylamine $\zeta$ or $\beta$.

I prefer, for example, one part of tannin introduced into about three parts of fused naphtylamine. When it has dissolved, the mixture is gradually heated up to about 150° to 180° centigrade. At the beginning there is considerable disengagement of steam or watery vapor, and the end of the reaction may be known by the feeble ebullition. By cooling, the new body crystallizes before the naphtylamine, and the excess of this latter is removed by pouring the heated mass into benzine or other solvent capable of removing such excess of amine not transformed without dissolving the gallonaphtylamide. I cite this mode of preparing the gallonaphtylamide merely as an example, without considering the proportions or temperatures indicated to be the only ones that will produce the desired result. The reaction, when catechine is employed, is similar to that described for tannin. I have condensed catechine with aniline, the toluidines, xylidines, &c., as well as with the $\zeta$ and $\beta$ naphtylamines. All of these bodies react on the chlorohydrate of nitroso-dimethylaniline and the aromatic nitroso derivatives of the tertiary amines in general, producing coloring-matters in a manner analogous to that described in the Patent No. 253,721. These coloring-matters are slightly soluble in the ordinary solvents, giving products of reduction with the alkaline bisulphites and dyeing mordanted fibers from a violet-red color up to a very blue violet.

The characteristics of these new products, the gallonaphtylamides $\zeta$ and $\beta$, are as follows: They are freely soluble in ethyl and methyl alcohols, and crystallize by evaporation in the form of crystalline masses. Glacial acetic acid also dissolves them; but they are dissolved with difficulty in ether free from alcohol, and with still greater difficulty in benzol and toluol. In boiling water these two gallonaphtylamides are only slightly soluble and crystallize on cooling — the $\zeta$ gallonaphtylamide in brilliant scales of a clear yellow color and the $\beta$ gallonaphtylamide in the form of small crystalline granules.

The coloring-matter produced by the action of the gallonaphtylamides $\zeta$ and $\beta$ on the chlorohydrate of nitroso-dimethylamine is not soluble in water, and when dissolved in acid produces a blue color. It is also insoluble in alkalies.

Having thus described my invention, I claim—

1. The improvement in the manufacture of coloring-matters, consisting in the production of violet coloring-matters by the action of nitroso derivatives of the tertiary amines on the products of condensation of tannin or its specified equivalent with the primary amines.

2. The improvement in the manufacture of coloring-matters, consisting in the condensation of tannin or its specified equivalent with the primary amines and the separation from the mass of the resultant amides, substantially as set forth.

3. The improvement in the manufacture of coloring-matters, consisting in the reduction with alkaline bisulphites of the product resulting from the action of nitroso derivatives of the tertiary amines on the products of condensation of tannin or its specified equivalent with the primary amines.

4. The coloring-matter or dye derived from nitroso-dimethylaniline and gallonaphtylamide, said coloring-matter being insoluble in water and alkalies, soluble in acid with a bright blue color, and forming with the alkaline bisulphites a compound adapted to be employed for dyeing and printing, substantially as set forth.

In witness whereof I have hereunto signed my name in the presence of two subscribing witnesses.

CARL ALEXIS MAYER.

Witnesses:
GEORGE GIFFORD,
CHS. A. RICHTER.